United States Patent [19]

Liu

[11] Patent Number: 4,660,804
[45] Date of Patent: Apr. 28, 1987

[54] QUICK-CONNECTOR ASSEMBLY FOR WATER SUPPLY

[76] Inventor: Ching-Song Liu, No. 6-3, Lane 365, Shui Yuan Road, Feng Yuan, Taichung, Taiwan

[21] Appl. No.: 798,638

[22] Filed: Nov. 15, 1985

[51] Int. Cl.⁴ ............................................. F16L 37/28
[52] U.S. Cl. .................................................. 251/149.6
[58] Field of Search ..................................... 251/149.6

[56] References Cited

U.S. PATENT DOCUMENTS

| | | | |
|---|---|---|---|
| 2,305,841 | 12/1942 | Carlson | 251/149.6 |
| 2,730,382 | 1/1956 | Mastri | 251/149.6 |
| 3,245,423 | 4/1966 | Hansen et al. | 251/149.6 |
| 3,575,221 | 4/1971 | Muchizuki et al. | 251/149.6 |

Primary Examiner—A. Michael Chambers
Attorney, Agent, or Firm—Lowe Price LeBlanc Becker & Shur

[57] ABSTRACT

A quick-connector assembly for water supply essentially comprising of a socket which is mounted to a moulding tool, and a connector body portion. This assembly is to provide water for cooling during moulding operation. Therefore, the quick-connector and socket for the connection of water supply to the moulding tool is characterized in that the socket is embedded within the surface of moulding tool. During moulding operation, the quick-connector is plugged into the socket, and at the same time, a passage is provided within the compartment of connector body portion, and so as to allow water to flow. When the quick-connector is disengaged from the socket, a spring urges a stopper to the passage of water, hence cutting off the flowing of water.

1 Claim, 5 Drawing Figures

QUICK-CONNECTOR ASSEMBLY FOR WATER SUPPLY

BACKGROUND OF THE INVENTION

This invention relates to a quick-connector assembly which supplies water to a moulding tool. When injecting liquefied material into a moulding tool at a high temperature, the moulding tool will be distorted due to the effect of high temperature. Consequently, the finished products are affected before they completely harden.

SUMMARY OF THE INVENTION

It is an object of the present invention to provide a quick-connector for the water supply of moulding tools, exhibiting a fast connecting action during moulding.

It is still another object of the present invention to provide a quick-connector for moulding tool water supplies such that when the quick-connector is plugged into the socket, water will flow into the moulding tool.

It is another object of the present invention to provide a quick-connector for moulding tool water supply with the characteristic that when the connector is disengaged from the socket, the water supply will automatically cut off.

The attainment of the foregoing and related objects, advantages and features of the invention should be more readily apparent after review of the following more detailed description of the invention, taken together with the drawings, in which:

DETAILED DESCRIPTION OF THE INVENTION

Figure 1:
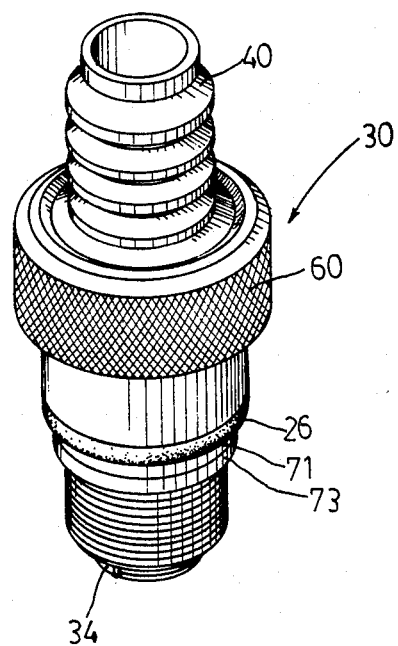
FIG. 1 is a perspective view of a quick-connector for moulding tool water supplies in accordance with the invention.

With reference now to the drawings and particularly to FIGS. 1-4 thereof, there is shown and illustrated a quick-connector for moulding tool supplies constructed in accordance with the principles of the present invention and designated generally by the reference character (30). The quick-connector comprises a hose holder (40), an extendable structure (2) having a spring (33) attached to the top portion (22) of said structure (2), two metallic rods (21) which are mounted perpendicularly to said structure (2), a stopper (23) which is disposed in between the metallic rod (21) which controls the flow of water into the socket (7).

Figure 3:
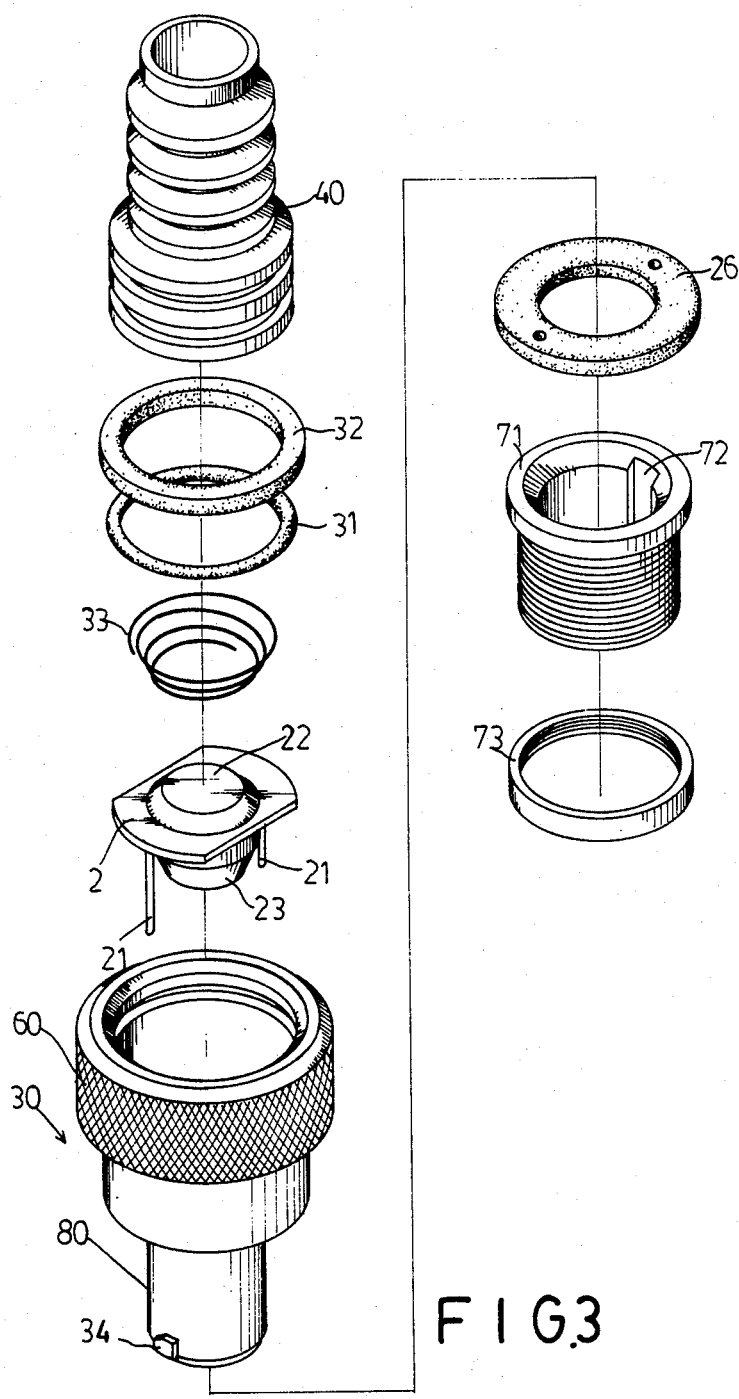
FIG. 3 is a fragmentary view of the present invention.
Figure 4:
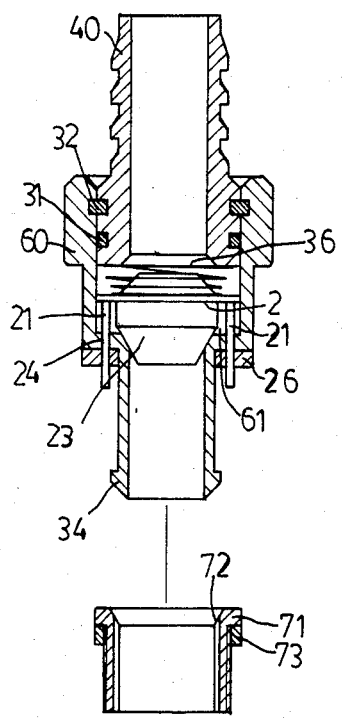
FIG. 4 shows a cross-sectional view of the quick-connector for water supply and socket.
Figure 5:
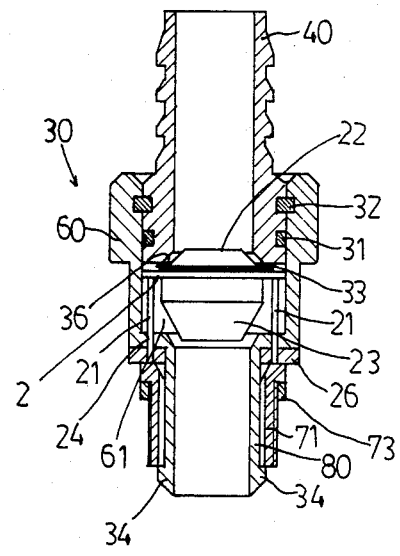
FIG. 5 is a cross-sectional view of the quick connector for water supply showing the socket in contact with the connector.

The body portion (60), as shown in FIG. 4, is cylindrical in shape with different diameters at different sections as can be seen from FIG. 3. The body portion (60) is provided with a compartment, a chamber (61) and the two openings (24) which define the passage for metallic rod (21) to be able to move up and down within the chamber (61). At one end of the body portion (60) of the smallest diameter section (80), two protuberances (34) are mounted, such that the protuberances (34) can be engaged with the water inlet socket (7).

As shown in FIG. 4, the socket (7) is cylindrically shaped with an external screw thread, one end of the cylindrically shaped socket (7) has a larger metallic ring (71) where the inner is provided with two slots (72) oppositely disposed at the internal edge for the passage of the protuberance (34).

Referring to FIG. 4, it can be seen that the hose holder (40) fits tightly into the chamber (61) of body portion (60), with one end of spring (33) being seated on the recess (36) of said holder (40). For the prevention of water leakage through the connection between the body portion (60) and hose holder (40), sealing rings (31)(32) are provided along the outer surface of the hose holder (40). The other end of said spring (33) is mounted on the top portion (22) of the extendable structure (2). The other part of stopper (23) blocks the passage of water from the supply to the socket (7) when metallic rod (21) is in contact with the metallic ring (71) of socket (7). When the extendable structure (2) is forced upward to compress the spring (33), then a passage (39) is formed which allows water to enter the moulding tool through socket (7). Further sealing rings (26)(73) are provided such that there is no water leakage through the openings (24). Water leakage is prevented by the sealing ring (26) mounted against the metallic bar (24). When the connector (30) turns ¼ round clockwise, the protuberance (34) will be tightly engaged with the end portion (71) of socket (7).

Figure 2:
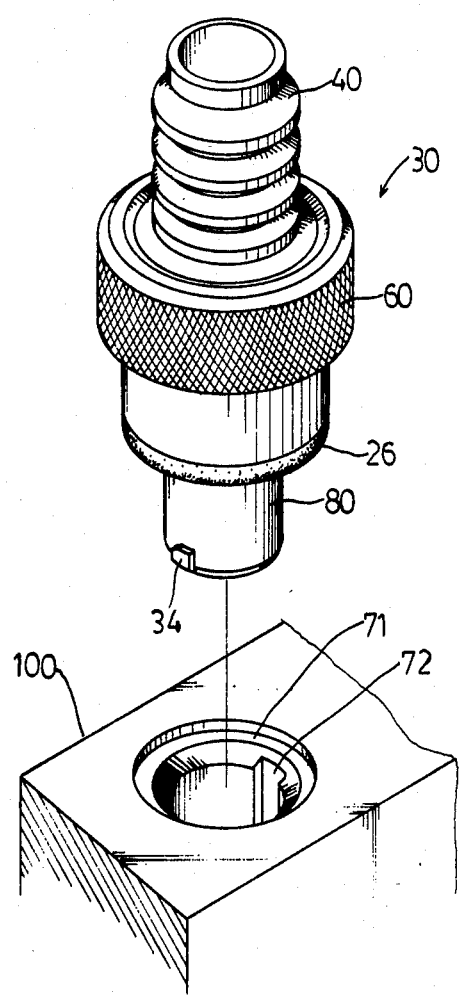
FIG. 2 is a perspective view of a quick-connector for water supply showing the position of socket in the moulding tool.

Water from the supply flows through the hose holder (40) and enters the chamber (61) of body portion (60). However if protuberance (34) is disengaged from socket (7) then the water is blocked by the stopper (23). Referring to FIG. 2, it can be seen that the water inlet socket (7) is embedded in said moulding tool (100) and is engaged with said connector (30) such that combination is completed and provided for moulding operation.

While the invention has been described, disclosed, illustrated and shown in terms of an embodiment or modification which it has assumed in practice, the scope of the invention should not be deemed to be limited by the precise embodiments or modifications herein shown, illustrated, described or disclosed, such other embodiments or modifications as may be suggested all fall within the scope and breadth of the claims here appended.

I claim:

1. A quick-connector assembly for connecting a moulding tool to a water supply hose, comprising:
   (a) a water inlet socket having a hollow center and a substantially cylindrical shape with external threads for threadedly securing the socket to embed same into a moulding tool;
   (b) a body portion attachable to said socket and having a hollow, generally cylindrical shaped compartment defining a flow passage;
   (c) an extendable structure having a stopper wherein one end of said stopper includes a spring, and two metallic rods mounted generally perpendicular to said structure and extending in a direction opposite said spring, said structure being seated by said rods within the compartment of said body portion and movable within the compartment by virtue of sliding movement of the rods to open and close the passage; and (d) a hose holder having annular grooves for securing a flexible rubber hose to the assembly, said hose holder further including a recess for receiving one end of the spring of said extendable structure, said hose holder defining an inlet to said passage, said spring normally urging the stopper against a seat in the compartment of the body portion to prevent a flow of water from the hose to the water inlet socket through said compartment and passage when the assembly is disengaged from the moulding tool.

* * * * *